United States Patent
Takano et al.

(10) Patent No.: US 9,501,002 B2
(45) Date of Patent: Nov. 22, 2016

(54) REPLACEMENT ENDLESS BELT WITH LUBRICATION LAYERS

(71) Applicant: CANON KABUSHIKI KAISHA, Tokyo (JP)

(72) Inventors: Hiroki Takano, Abiko (JP); Takatoshi Chiba, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/962,411

(22) Filed: Dec. 8, 2015

(65) Prior Publication Data
US 2016/0179040 A1 Jun. 23, 2016

(30) Foreign Application Priority Data
Dec. 22, 2014 (JP) ................. 2014-258166

(51) Int. Cl.
*G03G 15/20* (2006.01)
*B32B 27/06* (2006.01)
*B32B 27/18* (2006.01)

(52) U.S. Cl.
CPC ........... *G03G 15/2025* (2013.01); *B32B 27/06* (2013.01); *B32B 27/18* (2013.01); *G03G 15/2053* (2013.01); *B32B 2255/10* (2013.01); *B32B 2307/746* (2013.01); *B32B 2413/00* (2013.01); *B32B 2433/02* (2013.01); *G03G 2215/2016* (2013.01)

(58) Field of Classification Search
CPC ........... G03G 15/2025; G03G 15/161; G03G 15/165; G03G 15/2053; G03G 15/2057; G03G 15/2075; G03G 15/754; G03G 21/0041; G03G 2215/00139; G03G 2215/1623; G03G 2215/2009; G03G 2215/2016; G03G 2215/2035; B65G 45/00; B65G 45/02; B32B 27/06; B32B 27/18; B32B 2255/10; B32B 2307/554; B32B 2307/746; B32B 2413/00; B32B 2433/02
USPC ....... 399/325, 162, 302, 303, 308, 329, 352; 100/151; 474/91; 198/500; 428/98, 428/212, 221, 320.2, 321.1
See application file for complete search history.

(56) References Cited

U.S. PATENT DOCUMENTS

| | | | |
|---|---|---|---|
| 7,142,803 B2 * | 11/2006 | Koyama | G03G 15/206 219/216 |
| 8,781,364 B2 | 7/2014 | Fukuda et al. | |
| 2009/0252542 A1 * | 10/2009 | Creteau | G03G 15/2025 399/329 |
| 2010/0196066 A1 * | 8/2010 | Tamemasa | G03G 15/2025 399/329 |
| 2010/0202809 A1 * | 8/2010 | Shinshi | G03G 15/2064 399/329 |
| 2010/0254737 A1 * | 10/2010 | Sakai | G03G 15/206 399/329 |

(Continued)

FOREIGN PATENT DOCUMENTS

| | | | |
|---|---|---|---|
| JP | 2007-293012 A | 11/2007 | |
| JP | 2013-076868 A | 4/2013 | |
| JP | 2013186289 A | * | 9/2013 |

*Primary Examiner* — Robert Beatty
(74) *Attorney, Agent, or Firm* — Fitzpatrick, Cella, Harper & Scinto (57) ABSTRACT

An endless belt exchangeably usable with an image forming apparatus, the endless belt including a first lubrication layer applied on an inner surface of the endless belt, the first lubrication layer including lubrication particles and lubricant oil; a second lubrication layer provided on the first lubrication layer and including lubrication particles and lubricant oil; wherein a lubricant oil content of the first lubrication layer is larger than a lubricant oil content of the second lubrication layer.

15 Claims, 8 Drawing Sheets (56) References Cited

U.S. PATENT DOCUMENTS

| | | | | |
|---|---|---|---|---|
| 2011/0085831 A1* | 4/2011 | Hullman | ............ | G03G 15/2057 399/329 |
| 2012/0008887 A1* | 1/2012 | Adam | ..................... | B32B 15/08 384/42 |
| 2012/0155936 A1* | 6/2012 | Yamaguchi | ........ | G03G 15/2046 399/329 |
| 2013/0189008 A1* | 7/2013 | Ishii | ................... | G03G 15/2053 399/329 |
| 2013/0260097 A1* | 10/2013 | Takada | ...................... | B32B 5/16 428/143 |
| 2014/0113132 A1* | 4/2014 | Sakellarides | ............ | B41J 31/04 428/354 |
| 2015/0323890 A1* | 11/2015 | Nakamoto | ......... | G03G 15/2028 399/68 |

* cited by examiner

REPLACEMENT ENDLESS BELT WITH LUBRICATION LAYERS

FIELD OF THE INVENTION AND RELATED ART

The present invention relates to a replacement endless belt.

There have been proposed various fixing devices which employ an endless belt. These fixing devices are structured so that pressure is applied to their endless belt by their pressure applying component to form a nip (Japanese Laid-open Patent Application No. 2007-293012).

In the case of these fixing devices, fluorinated grease is placed between their pressure applying component and endless belt in order to minimize the friction between the endless belt and pressure applying component.

It has also been proposed to coat the inward surface of a brand-new endless belt with lubricant which dispersively contains particles of solid lubricant and lubricating oil, prior to the replacement of the used endless belt in a fixing device, with the brand-new one (Japanese Laid-open Patent Application No. 2013-076868).

One of the methods for extending, in life span, an endless belt such as the above-described one, is to increase the lubricant for the endless belt in the ratio of lubricating oil. However, if the lubricant for the endless belt is increased in the ratio of the lubricating oil, as the lubricant is applied to the endless belt, "wet" film of lubricant is formed on the surface of the endless belt. Thus, it is possible that when the used endless belt in a fixing device is replaced with this brand-new endless belt having "wet" film of lubricant, the "wet" film of lubricant will come into contact with the pressure applying component or the like of the fixing device, becoming therefore nonuniform in thickness. If the "wet" film of lubricant become nonuniform in thickness, it is possible that image defects will occur. Thus, the operation for replacing the used endless belt in the fixing device with a brand-new endless belt has been carried out very carefully. Therefore, the operation has to be reduced in efficiency. In other words, it will take more time to replace the endless belt.

On the other hand, reducing the lubricant in the ratio of lubricating oil in order to improve a fixing device in the efficiency with which the endless belt can be replaced, is contrary to the effort to extend the endless belt in life span.

Thus, it has been desired to improve an endless belt in the efficiency with which it can be replaced, while extending the endless belt in life span.

SUMMARY OF THE INVENTION

According to an aspect of the present invention, there is provided an endless belt exchangeably usable with an image forming apparatus, said endless belt comprising a first lubrication layer applied on an inner surface of said endless belt, said first lubrication layer including lubrication particles and lubricant oil; a second lubrication layer provided on said first lubrication layer and including lubrication particles and lubricant oil; wherein a lubricant oil content of said first lubrication layer is larger than a lubricant oil content of said second lubrication layer.

Further features of the present invention will become apparent from the following description of exemplary embodiments with reference to the attached drawings.

DESCRIPTION OF THE EMBODIMENTS

Hereinafter, the present invention is described in detail with reference to the most desirable embodiment of the present invention, and also, appended drawings. However, the measurements, materials, and shapes of the structural components of the fixing device in the following embodiment of the present invention, and the positional relation among the structural components, are not intended to limit the present invention in scope. That is, they are to be changed as necessary according to the structure of any of apparatuses and devices to which the present invention is to be applied, and also, various conditions under which the apparatuses and devices are used.

Embodiment

(1) Image Forming Apparatus

Figure 9:
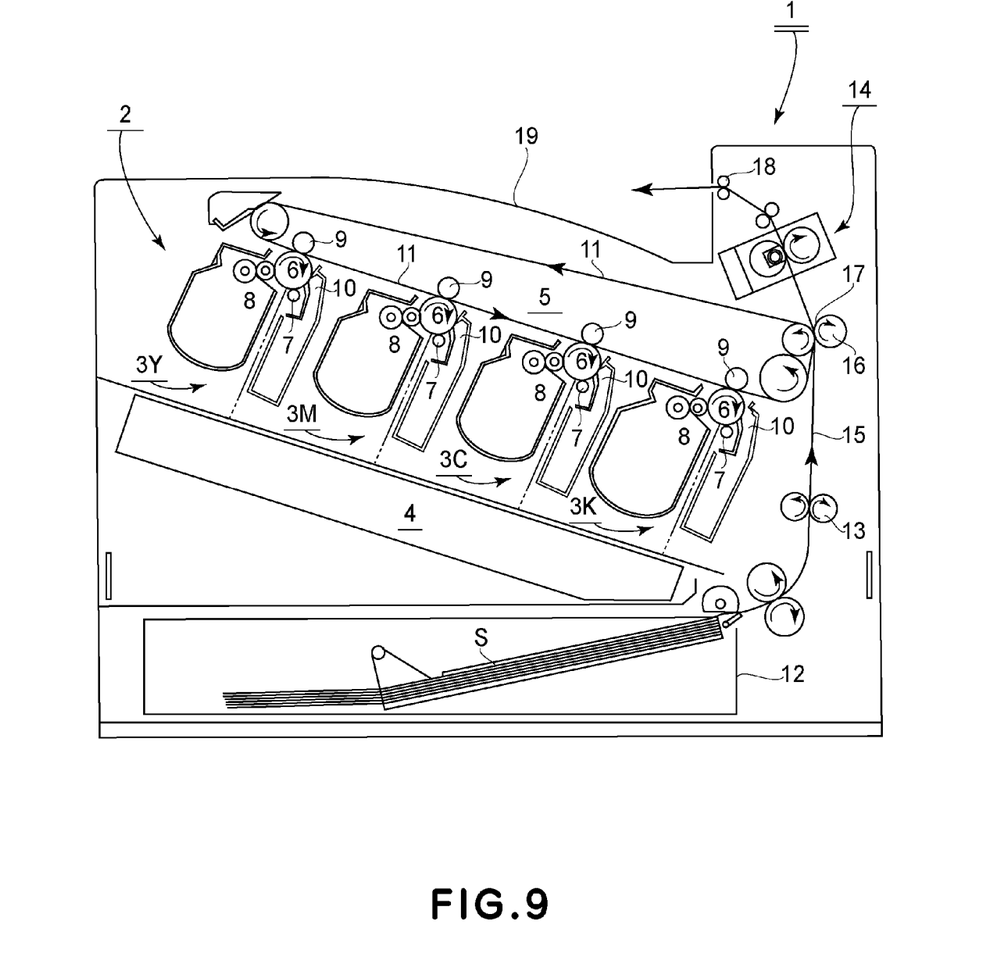
FIG. 9 is a schematic sectional view of a typical image forming apparatus to which the present invention is applicable. It shows the general structure of the apparatus.

FIG. 9 is a schematic sectional view of an example of an image forming apparatus 1 which is equipped with a fixing apparatus 14 (device) which employs an endless belt. It shows the general structure of the apparatus 1.

This image forming apparatus 1 is of the so-called intermediary transfer type, and also, of the tandem type. More concretely, it is an electrophotographic laser printer, which is capable of forming a full-color image on a sheet S of recording medium, and outputting the sheet S. The sheet S is a medium (recording medium) on which an image can be formed of toner. As examples of recording medium, a sheet of ordinary paper, a sheet of glossy paper, a sheet of resin, a sheet of cardstock, a post card, an envelop, a sheet of printing paper, a formatted sheet of paper, and the like can be listed. Hereafter, recording medium may be referred to as recording paper. The structure of the image forming apparatus 1 in this embodiment is well known except for the structure of its fixing device. Thus, it is not described in detail here.

A referential code 2 stands for an image forming section, which has: four process cartridges 3 (3Y, 3M, 3C and 3K), as image formation units, which are aligned in tandem; four laser scanner units 4 as exposing means; and an intermediary transfer unit 5. Each cartridge 3 has its own electrophotographic image forming means, more specifically, a rotational photosensitive component 6 which is in the form of a drum, and processing means, such as a charge roller 7, a developing device 8, a primary transfer roller 9, and a cleaning component 10, for processing the photosensitive component 6. The four cartridges 3 form yellow (Y), magenta (M), cyan (C) and black (K) toner images (images formed of developer) on their photosensitive component 6, one for one.

The abovementioned four toner images, different in color, are sequentially transferred in layers from the photosensitive components 6 onto the intermediary transfer belt 11 (primary transfer), effecting thereby a full-color toner image on the intermediary transfer belt 11. Then, the full-color toner image is transferred onto a sheet S of recording paper (secondary transfer), in the secondary transferring section 17, which is the area of contact effected between the intermediary transfer belt 11 and secondary transfer roller 16, by the application of pressure to the secondary transfer roller 16.

The sheets S of recording paper are fed one by one into the main assembly of the image forming apparatus 1 from a recording paper cassette 12 while being separated from the rest. Then, each sheet S is introduced into the secondary transfer nip 17 with a preset control timing through a recording paper conveyance passage 15 which includes a pair of registration rollers 13. In the secondary transfer nip 17, the toner image on the intermediary transfer belt 11 is transferred onto the sheet S (secondary transfer). Then, the sheet S is introduced into the fixing device 14, in which the toner image is thermally fixed to the sheet S by the application of heat and pressure.

After the sheet S of recording paper is conveyed out of the fixing device 14, the sheet S is discharged, as a full-color print, by a pair of discharge rollers 18 onto a delivery tray 19, which is a part of the upwardly facing surface of the image forming apparatus 1. In a case where the image forming apparatus 1 is in the monochromatic mode, such as the black-and-white mode, only the cartridge necessary to form a toner image of a specific color, for example, black toner image, is activated. That is, the cartridges which are not involved in the formation of the monochromatic toner image of the specific color, are not activated; they are idled.

Regarding the conveyance of the sheet S of recording paper through the image forming apparatus 1, the image forming apparatus 1 is structured so that when a sheet S of recording paper is conveyed through the image forming apparatus 1, the center of the sheet S coincides with the center of the recording medium conveyance passage, in terms of the widthwise direction of the passage, regardless of the size (width) of the sheet S.

(2) Fixing Device

Figure 3:
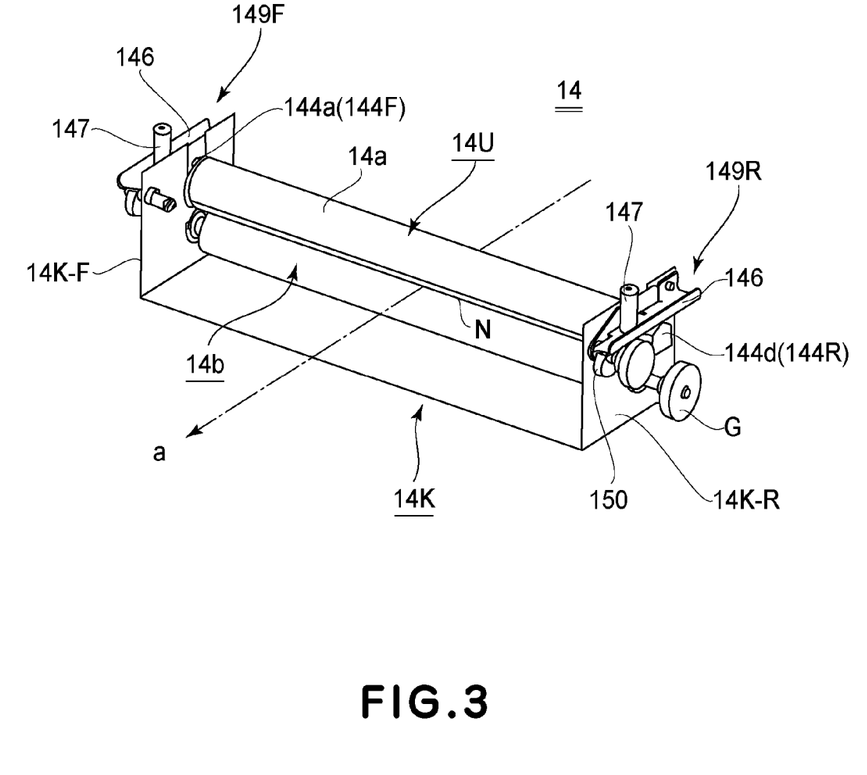
FIG. 3 is an external perspective view of the fixing device in the preferred embodiment, as seen on the rear side (recording paper exit side) of the device.
Figure 4:
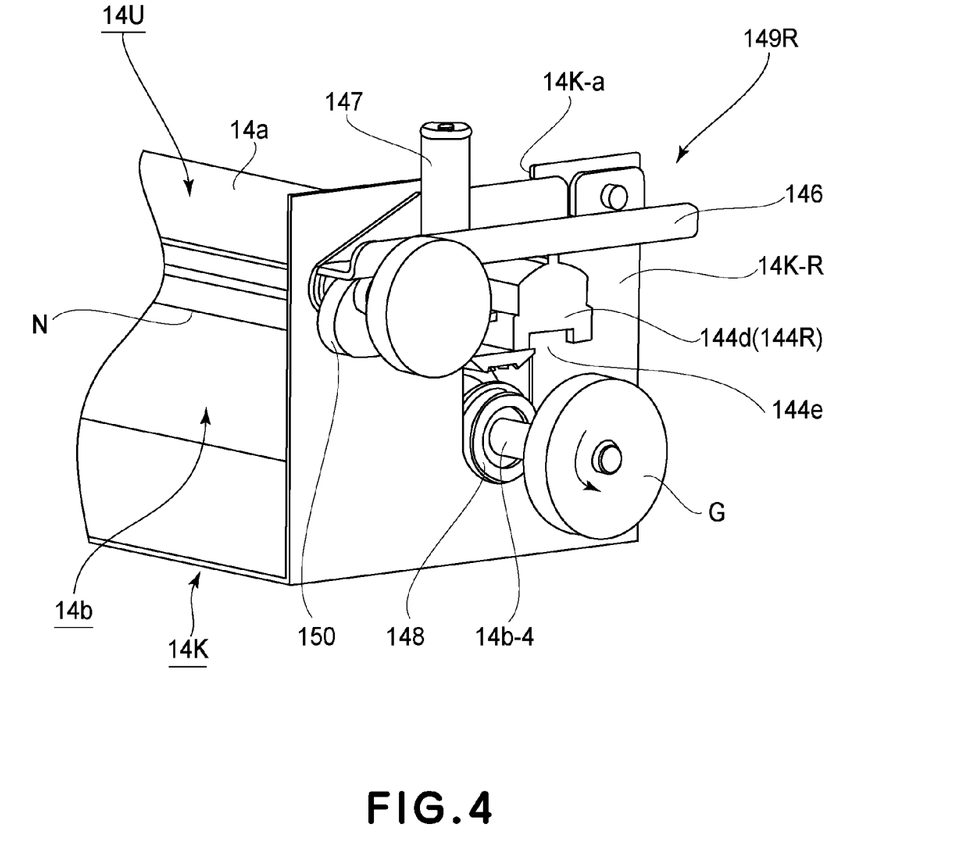
FIG. 4 is an enlarged perspective view of one of the lengthwise ends of the fixing device, shown in FIG. 3, from which the device is driven.
Figure 5:
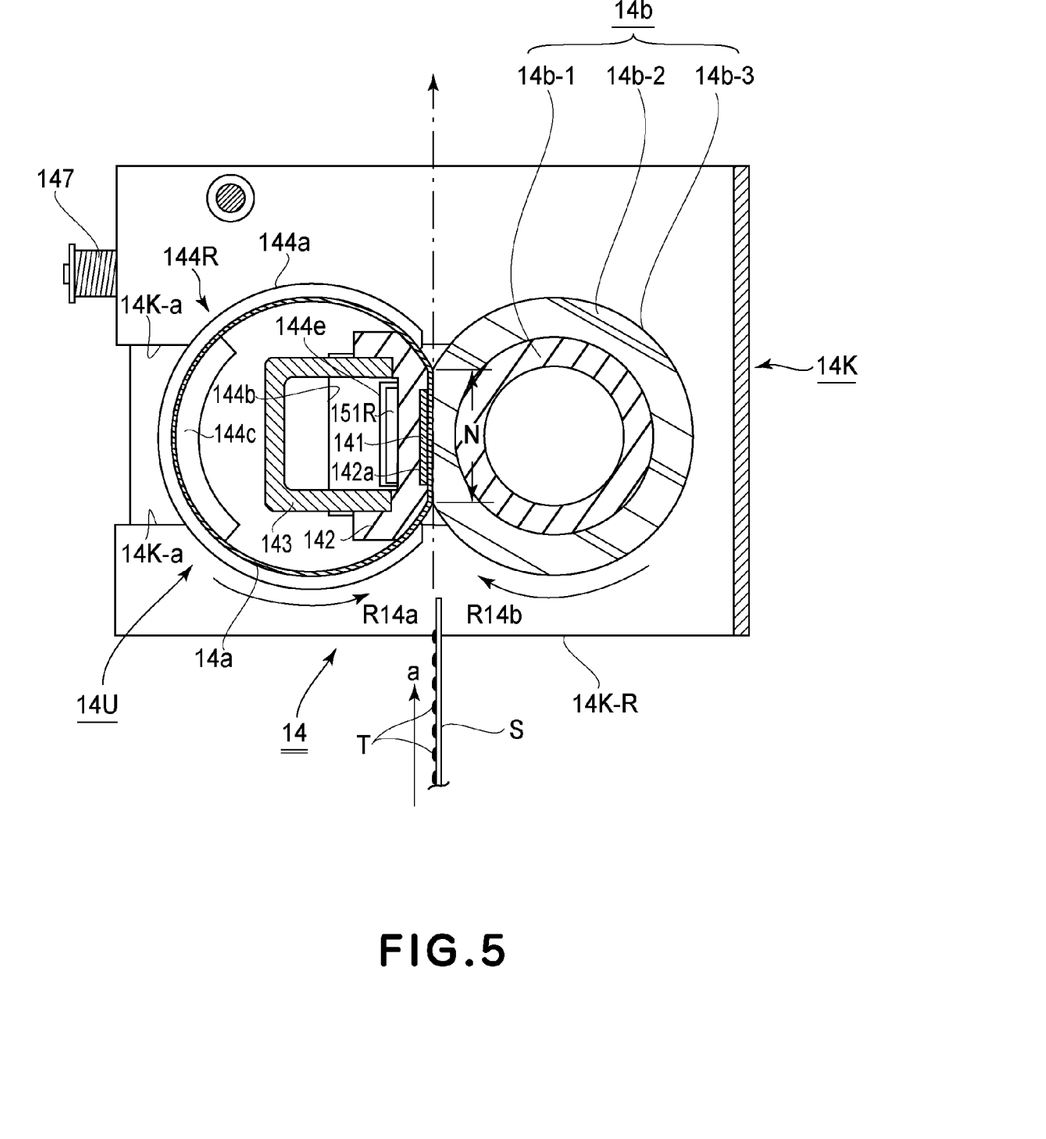
FIG. 5 is an enlarged cross-sectional view of the fixing device, shown in FIG. 3, as seen from the right side of the device.
Figure 6:
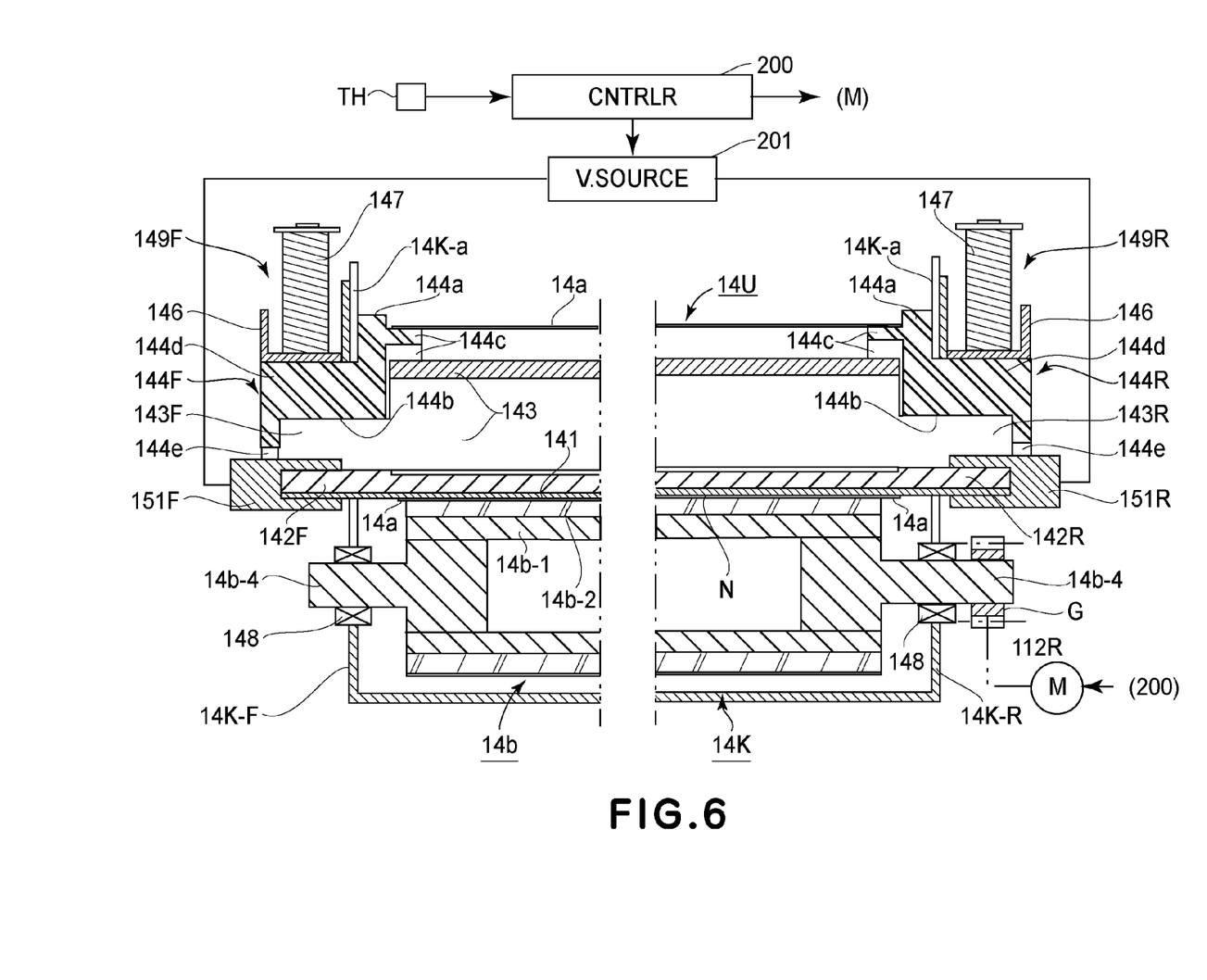
FIG. 6 is an enlarged vertical sectional view of the fixing device, shown in FIG. 3, at a vertical plane which coincides with axial line of the pressure roller of the device, as seen from the front side of the device. It does not show the center portion of the device.

The fixing device 14 in this embodiment is an image heating device of the belt-heating type, and also, of the pressure roller driving type (tensionless type). FIG. 3 is an external perspective view of the fixing device 14 as seen from the rear side (sheet outlet side) of the device. FIG. 14 is an enlarged view of the lengthwise end portion of the fixing device 14, from which the fixing device 14 is driven. FIG. 5 is an enlarged cross-sectional view of the fixing device 14 as seen from the right-hand side. FIG. 6 is a vertical sectional view of the fixing device 14, at a vertical plane which coincides with the axial line of the pressure roller, as seen from the front side of the device.

Regarding the orientation of the fixing device 14, and the structural component thereof, the front surface means the front surface as seen from the sheet entrance side of the device, and the rear surface means the opposite surface from the front surface (surface on sheet exit side). The left and right sides means the left and right sides as seen from the front side of the device (apparatus). The upward and downward direction means the upward and downward direction with reference to the direction of gravity. The upstream and downstream sides means the upstream and downstream sides with reference to the recording paper conveyance direction a. The lengthwise (or widthwise) direction, and the sheet width direction, means the direction which is practically parallel to the direction which is perpendicular to the recording paper conveyance direction a. The widthwise direction is the direction which is practically parallel to the recording paper conveyance direction a, in a plane which is parallel to the recording paper conveyance surface of the recording paper conveyance passage.

In this embodiment, the fixing device 14 is disposed in the main assembly of the image forming apparatus 1 in such an attitude that its front side, that is, the recording paper entrance side, faces downward (FIGS. 8 and 5). Thus, as a sheet S of recording paper is conveyed upward from the secondary transfer nip 17, it is guided into the fixing device 14 from the bottom side of the fixing device 14 by the sheet guiding component (unshown), which guides the sheet S by the rear (back) side.

The fixing device 14 has a belt unit 14U (fixing component) equipped with a fixation belt 14a (thermally conductive component) which is a rotational endless component. The fixation belt 14a heats an image on a sheet S of recording paper (recording medium), in the nip N. The fixing device 14 has also a pressure roller 14b (pressure applying component), as a nip forming component, which forms the nip N between itself and fixation belt 14a, and conveys the sheet S, on which a toner image T is present, through the nip N by pinching the sheet S between itself and fixation belt 14a. Furthermore, the fixing device 14 has a frame 14K (housing) which houses the belt unit 14U and pressure roller 14b.

(2-1) Belt Unit

Figure 7:
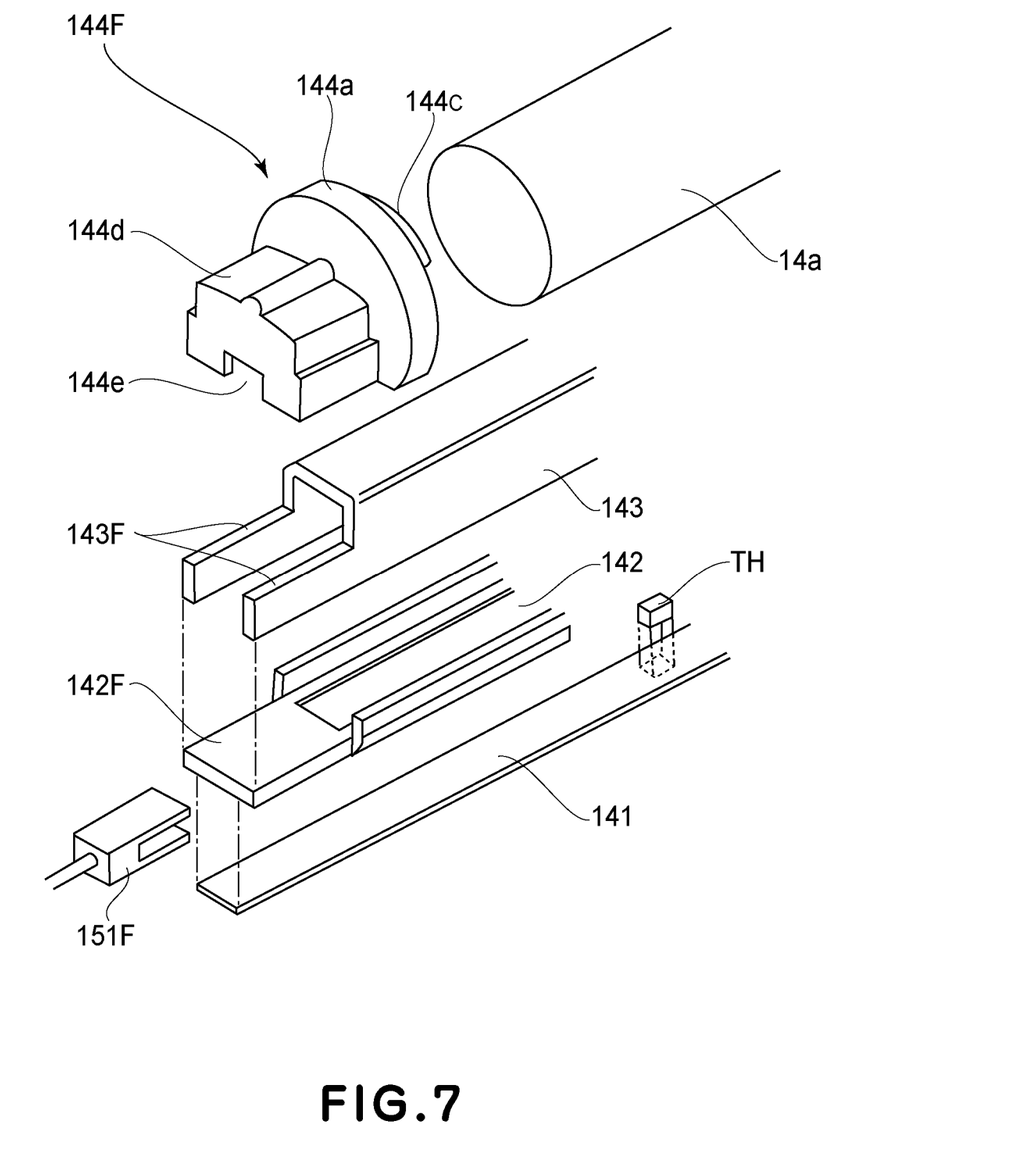
FIG. 7 is an enlarged schematic exploded perspective view of one of the lengthwise end portions of the belt unit.
Figure 8:
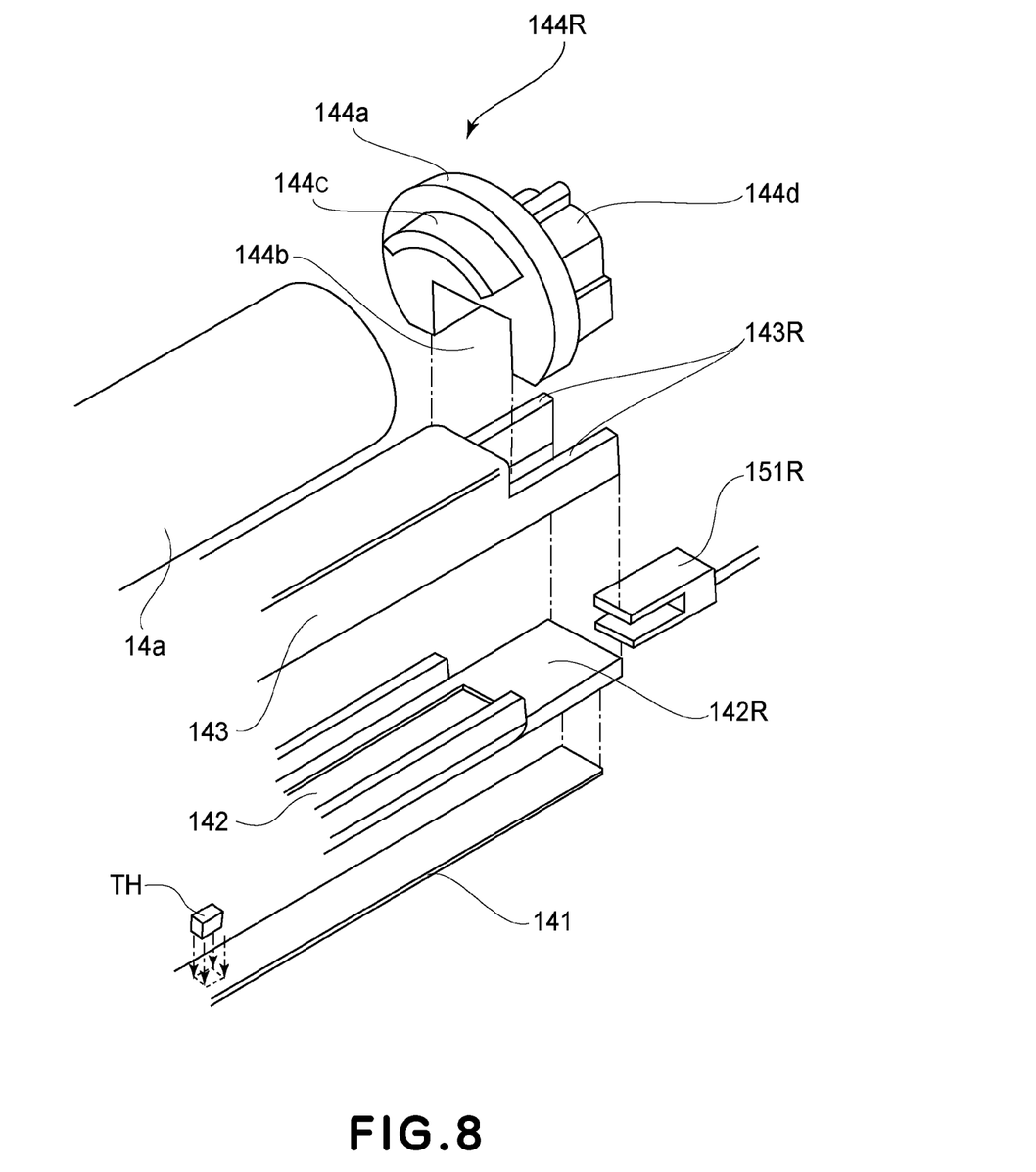
FIG. 8 is an enlarged schematic exploded perspective view of the other lengthwise end portion of the belt unit.

FIG. 7 is a schematic exploded perspective view of the left end portion of the belt unit 14U. FIG. 8 is a schematic exploded perspective view of the right end portion of the belt unit 14U. The belt unit 14U has: the fixation belt 14a which is flexible and cylindrical; a ceramic heater 141 (heating component) which is disposed on the inward side of the loop which the fixation belt 14a forms; a guiding component 142; and a stay 143 (reinforcement component). The belt unit 14U has also left and right belt holder 144F and 144R. The fixation belt 14a is such a component that as it is installed in the belt unit 14U, its lengthwise direction is parallel to the left-right direction of the ceramic heater 141, guiding component 142, and stay 143. As the fixation belt 14a is left alone, it is made roughly cylindrical by its own resiliency.

The fixation belt 14a is made up of a substrative layer, and a release layer. The substrative layer is formed of heat resistant resin such as polyimide, polyamide, and PEEK, heat resistant and highly thermally conductive metal such as SUS, Al, Ni, Cu and Zn, or alloys thereof. In a case where resin is used as the material for the substrative layer, particles of highly thermally conductive substance such as BN, alumina, and Al may be mixed into the resinous substance. As for the material for the release layer, which is formed, as the surface layer, on the substrative layer to prevent "offset", and also, to ensure that a sheet S of recording paper separates from the fixation belt 14a, it may fluorinated resin such as PTFE, PFA, PEP, ETFE, CTFE and PVD, or silicone resin which excels in release properties and does not contain heat resistant resin, or a mixture thereof.

Basically, the ceramic heater 141 is made up of a long, narrow, and thin ceramic substrate, and a heat generating component (layer of resistor which generates heat as electric current is flowed through it) formed on the surface of the ceramic substrate. It is small in thermal capacity. Thus, as electric current is flowed through its heat generating component, the entirety of the heat generating range of the heat generating component quickly increases in temperature. More concretely, the ceramic heater 141 is made up of a substrate formed of AlN which is excellent in terms of thermal conductivity, and a heat generating component formed on the substrate by printing and sintering. More concretely, the heat generating component was printed on the ceramic substrate, with the use of Ag—Pd paste as "ink", and then, the printed heat generating component was sintered. Moreover, the ceramic heater 141 is provided with a surface layer formed of glass, as a protective layer (upon which fixation belt 14a slides), on the heat generating component. The thickness of the protective layer is roughly in a range of 50-60 μm.

Furthermore, the fixing device 14 is provided with a thermistor TH, which is disposed on the opposite surface of the AlN substrate from the surface on which the heat generating component is present. The thermistor TH monitors the temperature of the AlN substrate. The thermistor TH is kept pressed upon the substrate by a pressure applying means (unshown) such as springs. A heater 141 is supported by the guiding component 142, by being fitted in the groove 142a formed in the outwardly facing surface of the guiding component 142.

The guiding component 142 (which hereafter will be referred to simply as guide 142) is molded of a heat resistant and thermally insulative material. It is in the form of a trough, which is roughly semicircular in cross-section. As the material for the guide 142, phenol, polyimide, polyamide, polyamide-imide, PEEK, PES, PPS, PFA, PTFE, LCP, and the like resin, which are excellent in insulating properties and heat resistance, are used.

Not only does the guide 142 support the heater 141, but also, plays the roles of backing up the fixation belt 14a in cooperation with the heater 141, applying pressure to a sheet of recording paper, in the nip N formed between the fixation belt 14a and pressure roller 14b by the application of pressure to the pressure roller 14b, and keeping the fixation belt 14a stable while the fixation belt 14a is circularly moved. In this embodiment, a combination of the heater 141 and guide 142 makes up a component which supports the fixation belt 14a while the fixation belt 14a is not circularly moved. The fixation belt 14a is circularly movable, with its inward surface sliding on the combination of the heater 141 and guide 142.

The stay 143 is a rigid component. It is for preventing the guide 142, which is formed of resin and is relatively flexible, from bending, by being pressed on the inward surface of the guide 142. In this embodiment, it is molded of metal such as iron and aluminum. It is roughly U-shaped in cross-section.

The fixation belt 14a is loosely fitted around a combination (assembly) of the guide 142, by which the heater 141 is held, and the stay 143. The left end portion 142F (one of lengthwise end portions) of the guide 142 and the left end portion 143F (one of lengthwise end portions) of the stay 143 extend outward beyond the edge of the fixation belt 14a, whereas the right end portion 142R (other end portion) of the guide 142 and the right end portion 143R of the stay 143 extend outward beyond the right edge of the fixation belt 14a.

The length of the heater 141 roughly equals the overall length of the guide 142 including its outwardly extending left and right portions. The heater 141 is provided with a pair of power supply electrodes (unshown) which are formed on an area of the surface of the heater substrate, which correspond in position to the outwardly extending left and right portions 142F and 142R of the guide 142.

The left and right belt holders 144F and 144R are coupled with the left and right end portions 143F and 143R of the stay 143, which outwardly extend beyond the left and right edges, respectively, of the fixation belt 14a. More concretely, in this embodiment, the outwardly extending left and right portions 143F and 143R are fitted in the holes 144b with which the left and right belt holder 144F and 144R are provided, one for one, whereby the left and right belt holder 144F and 144R are coupled with the outwardly extending left and right end portions of the stay 143, respectively.

The left and right belt holder 144F and 144R have a flange which regulates the lateral movement of the fixation belt 14a, and a belt guiding circular portion 144c which guides the fixation belt 14a by the inward surface of the end portions of the fixation belt 14a. Further, the left and right belt holders 144F and 144R have a pressure bearing portion 144d, which is on the opposite side of the belt holders 144F and 144R from the circular portions 144c. That is, the left and right end portions of the fixation belt 14a are fitted around the belt guiding portions 144c of the left and right belt holders 144F and 144R, the outwardly extending left and right portions 143F and 143R of which are coupled with the left and right belt holders 144F and 144R.

(2-2) Pressure Roller

The pressure roller 14b has: a cylindrical metallic core 14b-1 formed of such metal as iron and aluminum; an elastic layer 14b2 formed of sponge, silicon rubber, or the like, on the peripheral surface of the metallic core 14b-1; and a release layer 14b-3, as surface layer, formed of PFA. The metallic core 14b-1 is provided a pair of shafts 14b-4 (left and right shafts), which are coaxial with the metallic core 14b1.

In this embodiment, the surface of the metallic core 14b-1 formed of iron, aluminum, or the like, is roughened by blasting or the like method, and cleaned. Then, it is inserted into a cylindrical mold, and liquid silicon rubber is poured into the mold. Then, the liquid silicon rubber is thermally hardened. During the above-described process, in order to form the release layer, as the surface layer, of the pressure roller 14b, a piece of tube which is made of PFA or the like resin, and the inward surface of which is coated in advance with primer, is inserted into the mold. Thus, while the silicon rubber is thermally hardened, the tube and rubber layer adhere to each other. The pressure roller 14b molded as described above is removed from the mold, and then, is subjected to the secondary vulcanization.

The pressure roller 14b is rotatably supported between the left and right lateral plates 14K-F and 14K-R of the housing 14K of the fixing device 14. More specifically, the left and right shafts 14b-1 are rotatably supported by the left and right lateral plates 14K-F and 14K-R, with the placement of bearings 148 between the shafts 14b-4 and the lateral plates 14K-F and 14K-R, respectively. The end portion of the right shafts 14b-4 is fitted with a driver gear G which is practically coaxial with the shaft 14b-4. To the pressure roller 14b, the driving force from a motor M which is controlled by the controlling section 200, is transmitted through a driving force transmission mechanism (unshown), whereby the pressure roller 14b, which is a rotationally drivable component, is rotationally driven at a preset peripheral velocity in the counter clockwise direction indicated by an arrow mark R14b shown in FIG. 5.

Each of the left and right lateral plates 14K-F and 14K-R of the fixing device housing 14K is provided with a slit 14K-a, which is positioned so that as the fixing device 14 is assembled, the two slits 14K-a will be symmetrically positioned with reference to the plane which is perpendicular to the lengthwise direction of the fixing device 14 and coincides with the center of the belt unit 14U in terms of the lengthwise direction. The base portion of the pressure bearing portion 144d of the flange 144F and the base portion of the pressure bearing portion of the flange 14R are inserted into these slits 14K-a, one for one. Thus, the belt holders 144F and 144R are supported by the left and right lateral plates 14K-F and 14K-R of the fixing device housing 14K in such a manner that they can be slid toward, or away from, the pressure roller 14b.

The belt unit 14U is disposed practically in parallel to the pressure roller 14b, in such an attitude that the heater 141 held by the belt unit 14U faces the pressure roller 14b, and also, that the pressure bearing portions 144d of the left belt holder 144F and the pressure bearing portion 144d of the right belt holder 144R are fitted in the afore-mentioned slits 14K-a, respectively. Furthermore, to the pressure bearing portion 144d of the left belt holder 144F and the pressure bearing portion 144d of the right belt holder 144R, a preset amount of pressure is applied by the left and right pressure application mechanisms 149F and 149R, respectively.

In this embodiment, the left and right pressure application mechanism 149F and 149R have a pressure application lever 146, a compression spring 147, a cam 150, etc. The pressure generated by the spring 147 as the spring 147 is compressed is applied to the pressure bearing portion 144d of the belt holders 144F (144R) through the pressure application lever 146.

The combination of the stay 143, guide 142, heater 141, and fixation belt 14a is kept pressed upon the pressure roller 14b, against the resiliency of the elastic layer 14b-2 of the pressure roller 14b. Thus, the nip N having a preset width in terms of the recording paper conveyance direction is formed between the fixation belt 14a and pressure roller 14b.

To the outwardly extending end portions 143F and 143R of the guide 143, by which the heater 141 is held, a pair of electrical connectors 151F and 151R are attached, respectively. More concretely, the electrical connectors 151F and 151R are put through the holes 144e, with which the pressure bearing portions 14d of the belt holders 144F and 144R are provided, respectively, and then, are attached to the outwardly extending left and right portions 143F and 14R of the guide 143. Thus, electrical connection is established between the heater 141 and an electrical power source 201 (electrical power source), making it possible for the heater 141 to be supplied with electric power from the electrical power source 201. Further, in this embodiment, the image forming apparatus 1 is structured so that the electrical information related to the temperature detected by the thermistor TH is fed back to the controlling section 200 by way of this electrical connector 150F or 150R.

(2-3) Fixing Operation

The controlling section 200 starts up the motor M in response to an image formation start signal (job start signal), in order to begin to rotationally drive the pressure roller 14b. As the pressure roller 14b is rotationally driven, the fixation belt 14a is subjected to rotational force (torque), that is, the friction which occurs between the peripheral surface of the pressure roller 14b and the outward surface of the fixation belt 14a, in the nip N. Thus, the fixation belt 14a is circularly moved by the rotation of the pressure roller 14b at a preset peripheral velocity, which is roughly the same as the peripheral velocity of the pressure roller 14b, in the clockwise direction indicated by the arrow mark R14a in FIG. 5, with the inward surface of the fixation belt 14a sliding on the outwardly facing surface of the combination of the guide 142 and heater 141, with the presence of no gap between the fixation belt 14a and the combination.

In order to ensure that the fixation belt 14a is smoothly rotated by the rotation of the pressure roller 14b, the inward surface of the fixation belt 14a is coated in advance with lubricant 145 (FIG. 1) to form a thin layer of lubricant (which hereafter may be referred to as lubricating film), on the inward surface of the fixing belt 114b. That is, the lubricant is applied to the inward surface of the fixation belt 14a to minimize the friction between the inward surface of the fixation belt 14a and the outwardly facing surface of the combination of the guide 142 and heater 141. This lubricant 145 is described in detail in the following section (2-4).

As the controlling section 200 begins to supply the heater 141 with the electric power from the electric power source 201, the heater quickly increases in temperature, and the information regarding the temperature detected by the thermistor TH is fed back to the controlling section 200. The controlling section 200 controls the amount by which electric power is supplied to the heater 141 from the electric power source 201 to start up the heater 141 to a preset fixation temperature, and keeps the temperature of the heater 141 at the preset fixation level, in response to the temperature information fed back from the thermistor TH. That is, the controlling section 200 controls the heater 141 so that the temperature of the heater 141 remains at the preset fixation level.

Thus, while the fixation belt 14a rotates with its inward surface sliding on the heater 141, it is heated to the preset fixation temperature. While the temperature of the fixation belt 14a is remaining at the preset fixation level, a sheet S of recording paper, which is bearing an unfixed toner image T, is introduced into the nip N from the secondary transfer nip 17 of the image forming section 2, and is conveyed through the nip N, remaining pinched between the fixation belt 14a and pressure roller 14b. Thus, the sheet S and the toner image T thereon are subjected to the heat from the fixation belt 14a, and the pressure in the nip N. Consequently, the toner image T is fixed, as a solid image, to the sheet S. As the sheet S is conveyed out of the nip N while remaining pinched between the fixation belt 14a and pressure roller 14b, it is separated from the surface of the fixation belt 14a by the curvature of the fixation belt 14a, and then, is conveyed out of the fixing device 14.

(2-4) Lubricant

Figure 1:
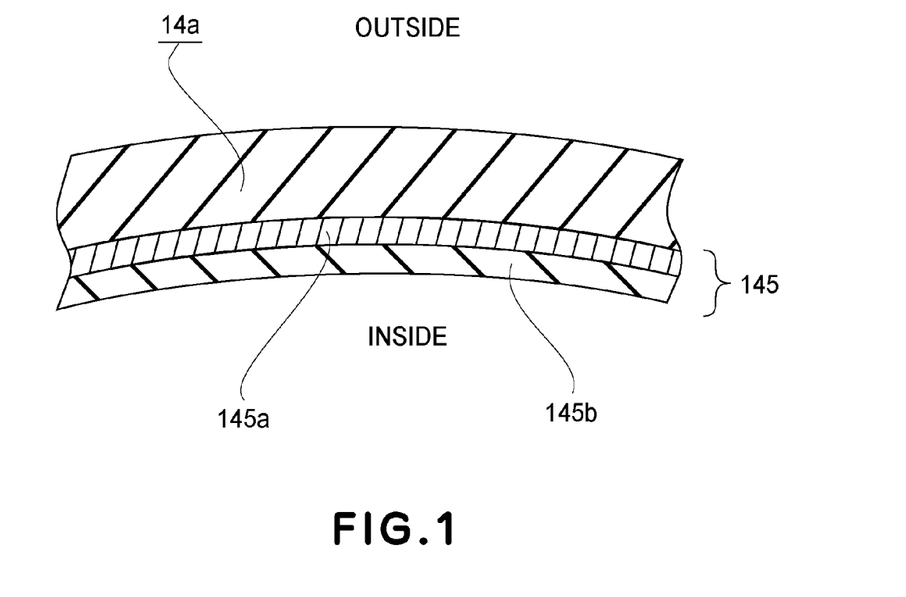
FIG. 1 is a schematic cross-sectional view of a part of the fixation belt of the fixing device in one of the preferred embodiments of the present invention, at a plane which is parallel to the thickness direction of the belt, and also, the moving direction of the belt. It shows the fixation belt, and the two layers of lubricant formed on the inward surface of the belt.

FIG. 1 is a schematic drawing for describing a lubricant layer 145 formed on the inward surface of the fixation belt 14a. As described above, the inward surface of the fixation belt 14a is coated with the lubricant 145 to minimize the friction between the inward surface of the fixation belt 14a and the combination of the heater 141 and guide 142. The area of the inward surface of the fixation belt 14a, which is coated with the lubricant 145, is as wide as the entire range of the fixation belt 14a in terms of the direction parallel to the shafts 14b-4 of the pressure roller 14b, or wider than the path of the widest (largest) sheet S of recording paper which is conveyable through the image forming apparatus 1.

The lubricant 145 is a combination of solvent and solid lubricant particles dispersed in the solvent. As the solid lubricant particles, powder of such fluorine resin as PTF, graphite, molybdenum disulfide, tungsten disulfide, or the like, is used. As the lubricating oil, highly heat resistant lubricating oil such fluorinated oil as PFE oil and silicon oil is used. As the solvent, highly volatile solvent such as MEK, IPA, HFE, xylene and toluene is used.

After the coating of the inward surface of the fixation belt 14a with the lubricant 145, the solvent in the lubricant 145 on the inward surface of the fixation belt 14a volatilizes. Thus, thin lubricating film is formed of solid lubricating particles and lubricating oil, on the area coated with the lubricant 145. The level to which the lubricating film will dry can be changed by changing the lubricant 145 in the mixing ratio between the solid lubricant particles and lubricating oil. All that is necessary in case where dry lubricating film is desired is to reduce the lubricant 145 in the mixing ratio of the lubricating oil. All that is necessary in a case where wet lubricating film is desired is to increase the lubricant 145 in the mixing ratio of the lubricating oil.

The lubricating film formed of lubricant 145, on the inward surface of the fixation belt 14a, is made up of the two layers of lubricating film, more specifically, the first lubricating film formed by coating the inward surface of the fixation belt 14a with the first lubricant 145a, and the second lubricating film formed on the first lubricant film 145a by coating the first lubricating film with the second lubricant 145b.

As the first lubricant 145a, wet lubricant or semi-wet lubricant which is relatively large in the mixing ratio of the lubricating oil is used, whereas as the second lubricant 145b, the dry lubricant, which is relatively small in the mixing ratio of the lubricating oil, is used to form a dry lubricating film.

In this embodiment, the definition of the wet lubricant, semi-wet lubricant, and dry lubricant, in terms of the mixing ratios of the lubricating oil, are as follows (ratio of lubricating oil relative to entirety of lubricant):

1) Wet lubricant: no less than 10 wt. %.
2) Semi-wet lubricant: no less than 3 wt. % and no more than 10 wt. %.
3) Dry lubricant: no more than 3 wt. %.

Figure 2:
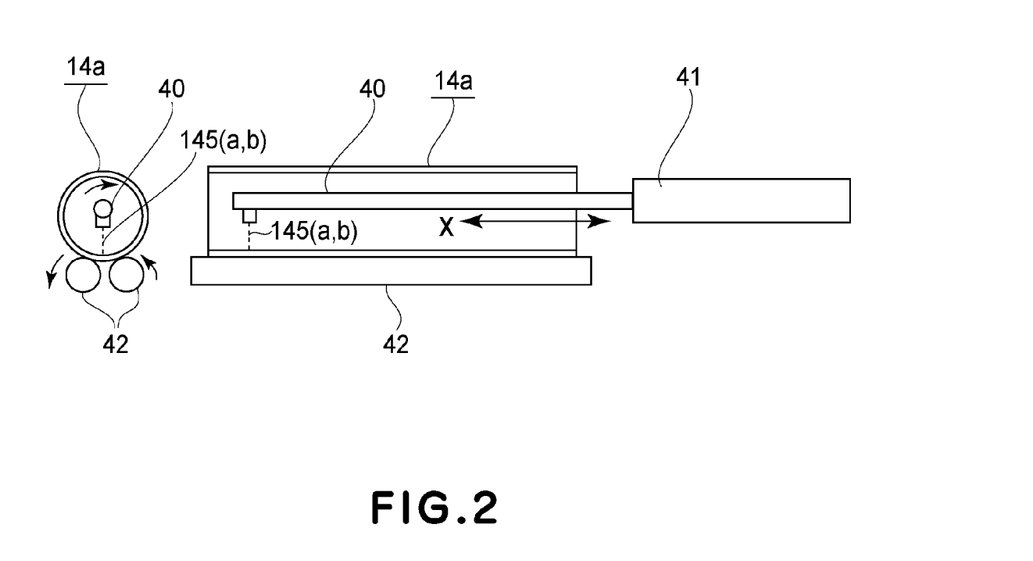
FIG. 2 is a drawing for describing the method for applying lubricant to the endless belt.

In order to make it possible to uniformly coat the fixation belt 14a with the lubricant 145, in terms of the lengthwise direction (width direction) of the fixation belt 14a, the lubricant 145 is released downward by a preset amount from a dispenser 41 having a horizontally extending nozzle 40, while the fixation belt 14a is rotated at a preset speed by a pair of belt supporting rollers 42. The sliding (extension and retraction) of the nozzle 40 of the dispenser 41, is synchronized with the timing with which the ejection pump of the dispenser 41 is activated to eject the lubricant, by controlling the nozzle 40 in position with the use of a combination of a ball screw and a motor. The amount by which the lubricant is to be applied is controlled by the shape of the opening of the nozzle 40 and the index value of the sensor for detecting the amount by which the lubricant 145 is flowing.

With the dispenser 41 structured and controlled as described above, the inward surface of the fixation belt 14a can be uniformly coated with the lubricant 145. First, the first lubricant 145a is applied, and is completely dried (solvent is completely volatilized) to form the first lubricating film. Then, the second lubricant 145b is similarly applied to the first lubricating film. Then, the solvent is completely volatilized, to form the second lubricating film.

The structure of the above-described belt can be summarized as follows. The inward surface of the fixation belt 14a is covered with the lubricating film which comprises at least two layers of lubricating film, that is, the lubricating film formed of the first lubricant 145a and the lubricating film formed of the second lubricant 145b. The ratio of the lubricating oil in the first lubricant 145a is greater than that in the second lubricant 145b. The outermost layer on the inward surface of the fixation belt 14a is the layer of the second lubricant 145b. The ratio of the lubricating oil in the first lubricant 145a is no less than 3 wt. %, and the ratio of the lubricating oil in the second lubricant 145b is no more than 3 wt. %.

That is, in this embodiment, an endless belt made by forming the first lubricating film on the inward surface of the fixation belt 14a by coating the inward surface of the fixation belt 14a with the first lubricant 145a, which is the wet lubricant, and then, forming the second lubricating film by coating the first lubricating film with the second lubricant, which is the dry lubricant, is used as the replacement endless belt. Thus, it is possible to replace the fixation belt 14a in the fixing device 14 through a simple process, without reducing the replacement fixation belt (14a) and lubricant in their life span.

FIG. 2 is a drawing for forming the first lubricating film on the inward surface of the fixation belt 14a by coating the inward surface of the fixation belt 14a with the first lubricant 145a, and the second lubricating film by coating the first lubricating film with the second lubricant 145b.

When a brand-new fixation belt 14a is inserted into the belt unit 14U in such a manner that it is fitted by an operator around the combination of the guide 142 and stay 143 in order to replace the deteriorated fixation belt 14a in the belt unit 14U with the brand-new fixation belt 14a, the first lubricating film formed of the first lubricant 145a which is the wet lubricant, has been covered in advance with the second lubricating film formed of the second lubricant 145b which is the dry lubricant. Thus, even if the fixation belt 14a comes into contact with the guide 142 and/or stay 143 while the fixation belt 14a is inserted, hardly any lubricant 145 adheres to the guide 142 and/or stay 143.

Therefore, it is less likely to occur that the fixation belt 14a becomes nonuniform in the thickness of the layer of the lubricant 145 in terms of the lengthwise direction of the fixation belt 14a. Thus, it is possible to prevent the formation of images which suffer from the nonuniformity attributable to the nonuniformity in the thickness of the layer of the lubricant on the inward surface of the fixation belt 14a. Furthermore, as the fixation belt 14a of the fixing device 14 begins to be rotated by the activation of the fixing device 14 after the replacement of the used fixation belt 14a in the belt unit 14U with a brand-new fixation belt 14a, the first lubricant 145a, of which the wet lubricating film is formed, mixes with the second lubricant 145b. Consequently, lubricating film which is highly durable and excellent in lubricity is formed on the inward surface of the fixation belt 14a.

As described above, in this embodiment, a fixation belt created by coating its inward surface with the first lubricant 145a, which is the wet lubricant or semi-wet lubricant, and coating the layer of the first lubricant 145a with the second lubricant 145b, which is dry lubricant, is used as the replacement fixation belt 14a. Therefore, the used fixation belt 14a in the belt unit 14U can be replaced through a simple process, without reducing the replacement fixation belt 14a and the lubricant 15 thereon in their left span.

[Miscellanies]

(1) In the above-described embodiment, the lubricating film is formed of two sub layers formed of two lubricants 145a and 145b, one for one. However, the embodiment is not intended to limit the present invention in scope in terms of the laminar structure of the fixation belt 14a. All that is required is that the fixing ratio of the lubricating oil in the last lubricant to be coated, relative to the entirety of the lubricant, is less than that of the lubricant which is to be coated immediately before the last lubricant. That is, all that is necessary is for the number of thin layers of lubricant (lubricating films) to be no less than two.

(2) Also in the above-described embodiment, the fixing device 14 employed such a mixing method that the heat applying side of the fixing device 14 is provided with the fixation belt 14a. However, the embodiment is not intended to limit the present invention in terms of fixing method. For example, the fixing method may be such that the pressure applying side of the fixing device 14 is provided with an endless belt (pressure belt).

That is, the fixing device 14 in the above-described embodiment is a fixing device which fixes an image T borne by a sheet S of recording paper to the sheet S by conveying the sheet S through the nip N formed by the combination of the belt unit 14U and pressure applying component 14b, while keeping the sheet S pinched between the belt unit 14U and pressure applying component 14b. However, the fixing device 14 may be structured so that at least one of the belt unit 14U and pressure applying component 14b has a pair of non-rotational supporting components 141 and 142, and an endless belt 14a which is rotatable, with its inward surface sliding on the above-described supporting components.

(3) The preceding embodiment was described with reference to a fixing device for fixing an unfixed toner image T. However, the present invention is also applicable to a device (which is also referred to as fixing device) for applying heat and pressure to a toner image which has been temporarily fixed to a sheet S of recording paper, in order to improve the image in glossiness.

(4) The application of the present invention is not limited to an image forming apparatus, the image forming section 2 of which employs an electrophotographic image forming method. For example, the present invention is also applicable to an image forming apparatus which employs an electrostatic recording method or a magnetic recording method. Furthermore, the application of the present invention is not limited to an image forming apparatus of the transfer type. That is, the present invention is also applicable to an image forming apparatus structured to directly form an unfixed image on a sheet of recording paper.

(5) The preceding embodiment was described with reference to the replacement endless belt for the fixing device 14. However, the application of the present invention is not limited to the replacement endless belt for the fixing device 14. For example, the present invention is also applicable to a replacement endless belt for the intermediary transfer belt, recording medium conveyance belt, or the like, of an image forming apparatus.

The application of the present invention is not limited to a device (apparatus), such as the fixing device in the preceding embodiment of the present invention, which is of the so-called tension-free type (tensionless type). Devices (apparatuses) to which the present invention is applicable include those structured so that an endless belt is rotatably suspended and tensioned by multiple belt suspending components (including non-rotational components).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-258166 filed on Dec. 22, 2014, which is hereby incorporated by reference herein in its entirety.

What is claimed is:

1. An endless belt exchangeably usable with an image forming apparatus, the endless belt comprising:
   a first lubrication layer applied on an inner surface of the endless belt, the first lubrication layer including lubrication particles and lubricant oil;
   a second lubrication layer provided on the first lubrication layer and including lubrication particles and lubricant oil;
   wherein a lubricant oil content of the first lubrication layer is not less than 3 wt %, and
   wherein a lubricant oil content of the second lubrication layer is less than 3 wt %.

2. The endless belt according to claim 1, wherein the lubricant oil content of the first lubrication layer is from 3 wt % to less than 10 wt %.

3. The endless belt according to claim 1, wherein the lubrication particles of the first lubrication layer comprise a fluorine resin material.

4. The endless belt according to claim 1, wherein the lubrication particles of the first lubrication layer comprise graphite.

5. The endless belt according to claim 1, wherein the lubrication particles of the first lubrication layer comprise disulfide molybdenum.

6. The endless belt according to claim 1, wherein the lubrication particles of the first lubrication layer comprise disulfide tungsten.

7. The endless belt according to claim 1, wherein the lubricant oil of the first lubrication layer comprises fluorine oil.

8. The endless belt according to claim 1, wherein the lubricant oil of the first lubrication layer comprises silicon oil.

9. The endless belt according to claim 1, wherein the lubrication particles of the second lubrication layer comprise a fluorine resin material.

10. The endless belt according to claim 1, wherein the lubrication particles of the second lubrication layer comprise graphite.

11. The endless belt according to claim 1, wherein the lubrication particles of the second lubrication layer comprise disulfide molybdenum.

12. The endless belt according to claim 1, wherein the lubrication particles of the second lubrication layer comprise disulfide tungsten.

13. The endless belt according to claim 1, wherein the lubricant oil of the second lubrication layer comprises fluorine oil.

14. The endless belt according to claim 1, wherein the lubricant oil of the second lubrication layer comprises silicon oil.

15. The endless belt according to claim 1, wherein the endless belt is usable with an image fixing device for the image forming apparatus.

\* \* \* \* \*